(12) United States Patent
Nanda et al.

(10) Patent No.: US 12,117,717 B2
(45) Date of Patent: Oct. 15, 2024

(54) APPARATUS FOR A SECURITY CAMERA

(71) Applicant: MOTOROLA SOLUTIONS, INC., Chicago, IL (US)

(72) Inventors: Amar Nanda, Surrey (CA); Natalia Elena Ursan, Burnaby (CA); Sudeep Mohan, Surrey (CA); Andrew Stark, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 127 days.

(21) Appl. No.: 18/172,486

(22) Filed: Feb. 22, 2023

(65) Prior Publication Data

US 2024/0280885 A1 Aug. 22, 2024

(51) Int. Cl.
*G03B 17/56* (2021.01)
*G03B 15/05* (2021.01)
*G03B 17/02* (2021.01)

(52) U.S. Cl.
CPC ........... *G03B 17/561* (2013.01); *G03B 15/05* (2013.01); *G03B 17/02* (2013.01); *G03B 17/563* (2013.01); *G03B 2215/0503* (2013.01); *G03B 2215/0567* (2013.01)

(58) Field of Classification Search
None
See application file for complete search history.

(56) References Cited

U.S. PATENT DOCUMENTS

| | | | |
|---|---|---|---|
| 8,786,765 B1 | 7/2014 | Yang et al. | |
| 9,255,673 B2 | 2/2016 | Horn et al. | |
| 10,012,361 B2 | 7/2018 | Stavely et al. | |
| 10,113,735 B2 | 10/2018 | Emerson et al. | |
| 10,488,737 B2 * | 11/2019 | Bingleman | G03B 17/561 |
| 11,050,907 B1 * | 6/2021 | Yoo | G08B 13/19632 |
| 11,467,365 B2 | 10/2022 | Mohan et al. | |
| 2014/0192258 A1 | 7/2014 | Yang et al. | |
| 2017/0205686 A1 * | 7/2017 | Bingleman | G03B 17/55 |
| 2023/0023735 A1 * | 1/2023 | Jones | G03B 15/03 |

FOREIGN PATENT DOCUMENTS

| | | | |
|---|---|---|---|
| CN | 202195358 U | 4/2012 | |
| DE | 202010017528 U1 | 1/2012 | |
| JP | 2003008954 A | 1/2003 | |
| KR | 101731599 B1 * | 4/2017 | |
| WO | WO-2008017857 A1 * | 2/2008 | G08B 13/19619 |

OTHER PUBLICATIONS

The International Search Report and the Written Opinion corresponding patent application No. PCT/US2024/012485, filed: Jan. 23, 2024, mailed: May 24, 2024, all pages.

* cited by examiner

*Primary Examiner* — Rodney E Fuller
(74) *Attorney, Agent, or Firm* — Barbara R. Doutre (57) ABSTRACT

A security camera and assembly include a camera lens assembly, a lens tilt locking mechanism, and a grab handle having LEDs mounted thereon. Embodiments include a lens tilt locking mechanism coupled to the camera lens assembly for setting a field of view (FOV) for a camera lens of the camera lens assembly. The grab handle is pivotally coupled to the camera lens assembly via a pivoting mechanism. The grab handle having LEDs mounted thereon pivots to provide independent control of illumination to the FOV without shifting the FOV. In a further embodiment, the grab handle may further include an antenna embedded therein.

19 Claims, 8 Drawing Sheets

APPARATUS FOR A SECURITY CAMERA

BACKGROUND OF THE INVENTION

Security cameras are increasingly being deployed in homes, businesses, and public spaces. Security cameras are often mounted to a wall or ceiling for capturing still images or video within a particular environment. A camera's field of view (FOV) refers to what is visible through the camera lens. The camera's FOV may be negatively impacted by reflective surfaces. For example, a moderately reflective surface or object can cause hot spots within the camera's FOV. A hot spot is a region of clipped whites which cannot, by most means, be recovered. These hot spots affect obtaining useful image sectors.

Accordingly, there is a need for an improved security camera that can minimize reflection in the camera's field of view (FOV).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIGS. 3A, 3B, 3C show illumination LEDs angular position relative to the position of the lens optical axis in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned previously, a security camera may often be exposed to reflections that can negatively obscure images in the camera's field of view (FOV). Currently, illuminating light-emitting diodes (LEDs) used on a security camera point in the same, fixed direction as the axis of the camera lens. Generally, illumination is brighter in the center than towards the edges of the FOV. However, the fixed direction of the LEDs can lead to illumination issues caused by light being reflected from surrounding objects, where such surrounding objects are located closer to the camera than the target area of interest. These reflections may cause hot spots (also referred to as bright spots) affecting useful image sectors.

Briefly, there is provided herein a security camera assembly for a security camera. The embodiments include a security camera that includes a camera lens assembly, a lens tilt locking mechanism, and a grab handle having LEDs mounted thereon. The lens tilt locking mechanism is coupled to the camera lens assembly for setting a field of view (FOV) for a camera lens of the camera lens assembly. The grab handle is pivotally coupled to the camera lens assembly, the grab handle having LEDs mounted thereon provides independent pivoting control of illumination to the FOV without shifting the FOV.

The embodiments further provide a security camera assembly with adjustable LED positioning for improved illumination of a target area. The security camera comprises a lens assembly including a lens tilt locking mechanism for tilting and locking the camera lens to a locked camera lens position thereby setting a fixed lens optical axis. The security camera further comprises a plurality of illumination LEDs mounted to a substrate and a pivoting mechanism that couples the substrate to the lens assembly. The pivoting mechanism pivots the substrate independently of the locked camera lens position, thereby providing adjustable positioning of the illumination LEDs along an LED illumination axis independently of the lens optical axis. The adjustable LED positioning provides for improved illumination of a target area which minimizes reflections from nearby objects.

Further embodiments take advantage of the pivoting grab handle by embedding an antenna therein. Embedding the antenna in the grab handle provides an optimized placement location which avoids detuning of the antenna by metal components.

Figure 1A:
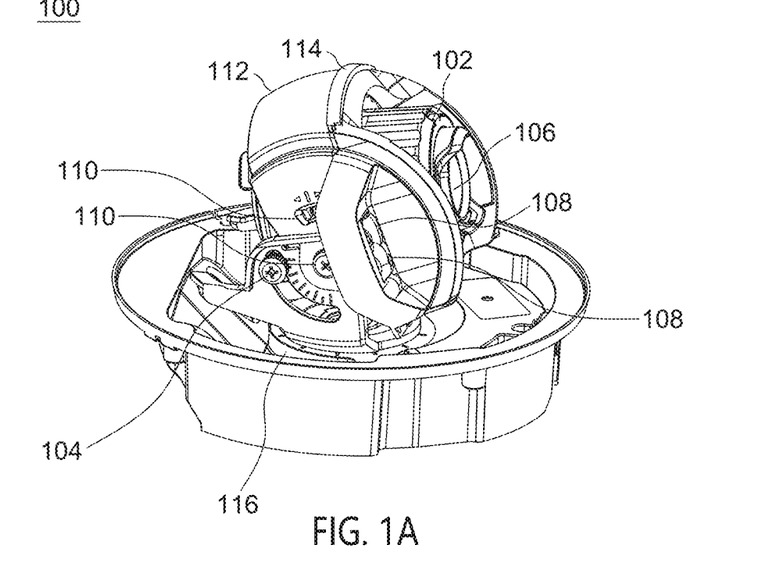
FIG. 1A depicts a security camera assembly in accordance with various embodiments.
Figure 1B:
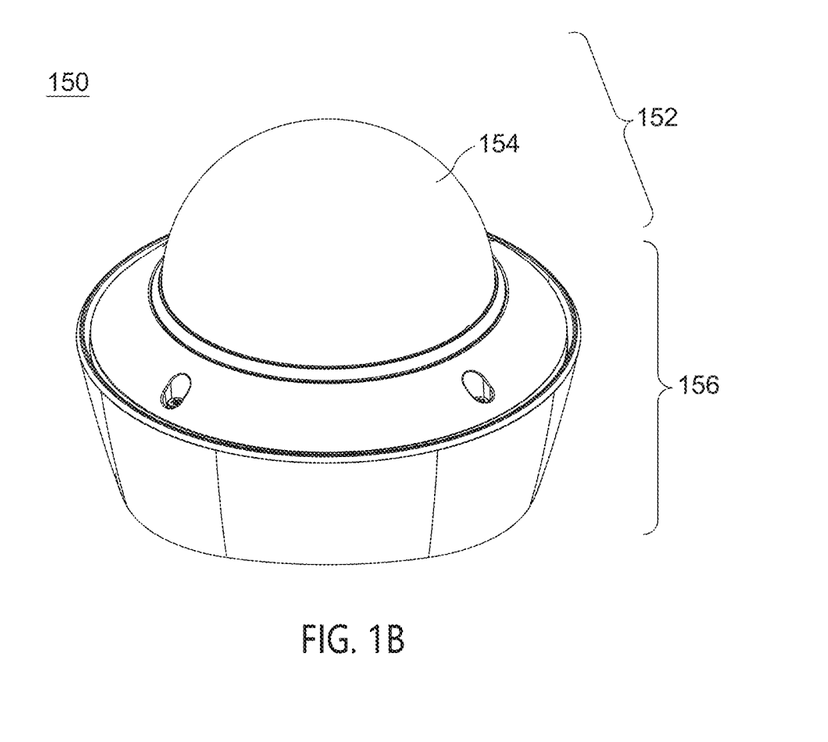
FIG. 1B depicts a housing enclosing the security camera assembly of FIG. 1A in accordance with various embodiments.

FIG. 1A depicts a security camera assembly 100 formed in accordance with various embodiments. The security camera assembly 100 may be mounted within a housing for example as shown in FIG. 1B. The security camera assembly 100 comprises a camera lens assembly 102 including a lens tilt locking mechanism 104 for tilting a camera lens 106 and locking the camera lens to a locked camera lens position thereby setting a lens optical axis (shown in later views). The security camera assembly includes a plurality of illumination LEDs 108 controlled by a pivoting mechanism 110. The plurality of LEDs 108 may include, for example, infrared (IR) LEDs white light LEDs, or other suitable illumination LEDs for lighting a target area. In accordance with the embodiments, the pivoting mechanism 110 pivots the plurality of LEDs (along a LED illumination axis) independently of the locked camera lens position (locked lens optical axis) to improve illumination and minimize reflections. The independent adjustment of the LEDs is controlled via a shroud 112 coupled to the camera lens assembly 102, the shroud having the LEDs integrated therein as part of a grab handle 114. Rotation of the grab handle 114 enables user control of the LED position adjustment. The security camera assembly 100 includes a mounting base 116, and for the purposes of this application the lens tilt locking mechanism 104 tilts the lens optical axis relative to the mounting base 116.

In a further embodiment (to be described later in conjunction with FIG. 5A and FIG. 5B), the shroud 112 may also include an antenna embedded as part of the grab handle. The antenna pivots when the LEDs pivot. Placement of the antenna within the grab handle keeps the antenna separated from interior metal elements within the housing which might cause detuning. All pivot positions are configured to keep the LEDs 108 and the antenna within the dome of the housing when the cover is placed over the assembly.

FIG. 1B depicts a security camera 150 having a housing enclosing the security camera assembly 100 of FIG. 1A in accordance with various embodiments. The housing includes upper housing portion 152 having a protective removable cover with transparent dome 154 and a lower housing portion 156 for receiving the base 116 of the security camera assembly 100. The security camera 150 is surface mountable via mounting base 116 within lower housing portion 156 which may couple to a ceiling or wall using screws, snaps or other suitable mounting means. Hence, the lower housing portion and base 116 of the security camera 150 may be secured to a surface mountable surface (wall or ceiling) while lens adjustments for FOV and illumination adjustments of the LEDs are made. The protective cover is then secured over the mounted assembly. The LEDs 108 pivot within the transparent dome 154. Hence, the camera lens assembly 102 is set for a target FOV via the lens tilt locking mechanism 104, and the positioning of the LEDs 108 are adjusted using the grab handle 114 to control the pivot mechanism 110 to adjust for reflections in the FOV. Removal of the removable cover provides interior access to the lens tilt locking mechanism and pivoting mechanism for on-site adjustments that can be made by a user.

Integrating the LEDs 108 within the grab handle 114 internal to the transparent dome 154 of the housing allows the security camera 150 to retain a compact size with minimal piece parts. The security camera assembly 100 is thus advantageously capable of accommodating on-site adjustments to the FOV and independent adjustment of the illumination to the FOV for improved image quality.

Figure 2A:
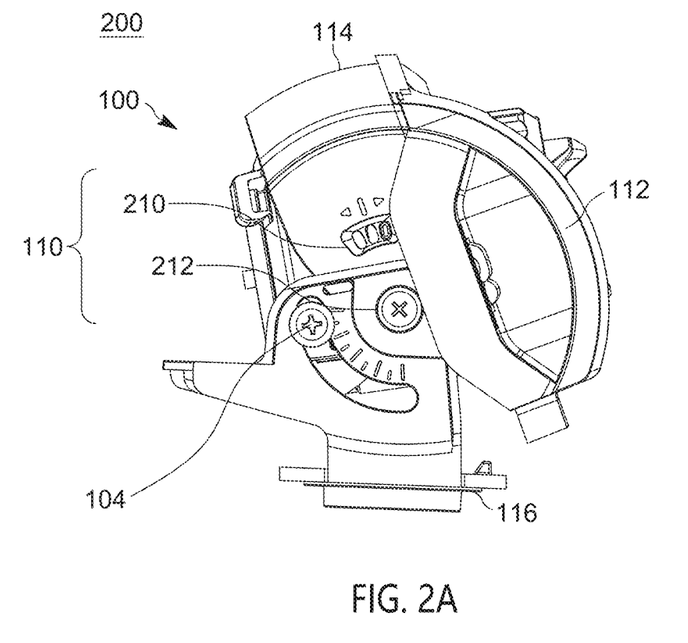
FIG. 2A depicts a side view of the security camera assembly in accordance with some embodiments.
Figure 2B:
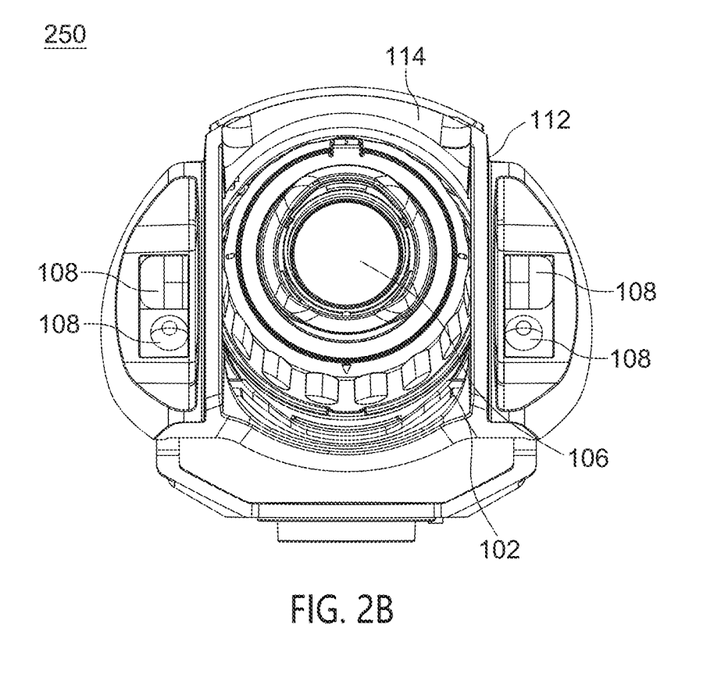
FIG. 2B depicts a front view of the security camera assembly in accordance with some embodiments.
Figure 3A:
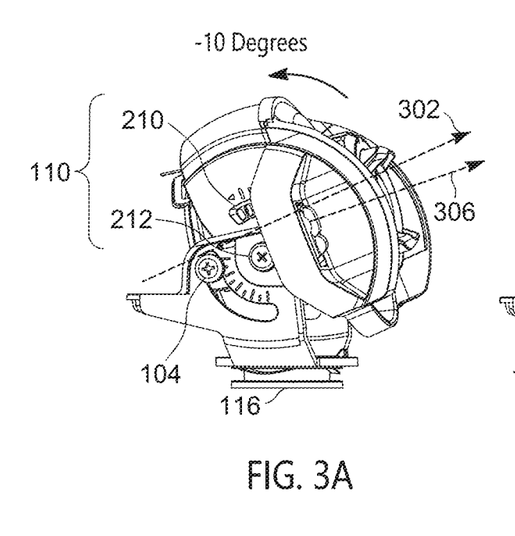
FIG. 3A depicts the security camera assembly in a first illumination position.
Figure 3B:
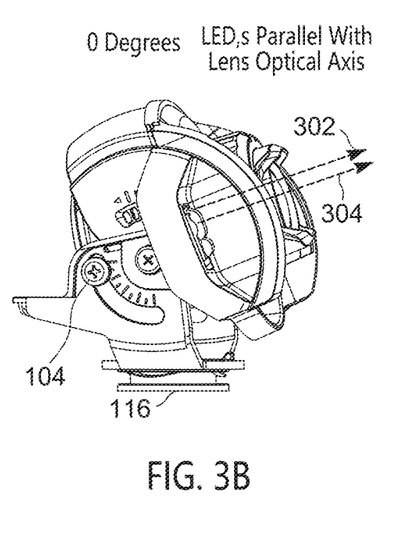
FIG. 3B depicts the security camera assembly in a second illumination position.
Figure 3C:
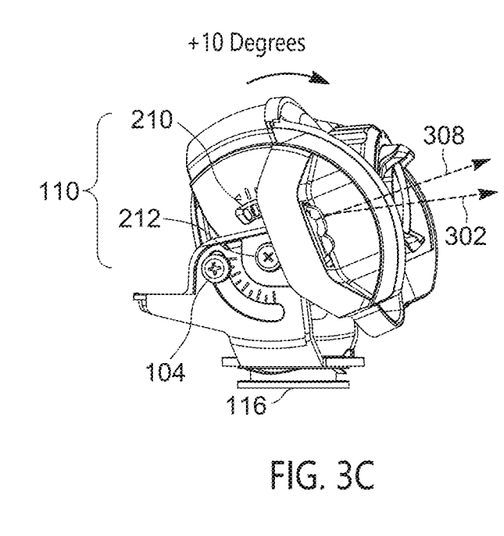
FIG. 3C depicts the security camera assembly in a third illumination position.

FIG. 2A depicts a side view 200 of the security camera assembly in accordance with some embodiments. FIG. 2B depicts a front view 250 of the security camera assembly in accordance with some embodiments. LEDs 108 are integrated within the shroud 112 that wraps around the camera lens assembly 102, and movement of the LEDs is controlled by the shroud's grab handle 114. Unlike past configurations where LEDs moved with the lens, the pivoting mechanism 110 and grab handle with built-in LEDs enable adjustment of the LEDs position independently of the lens. The lens tilt locking mechanism 104 prevents the field of view (FOV) from shifting when the LEDs 108 are being adjusted FIGS. 3A, 3B, 3C show illumination LEDs angular position relative to the position of a lens optical axis 302 locked by lens tilt locking mechanism 104. In some embodiments, the pivoting mechanism 110 may be configured for continuous rotation, or as depicted in these figures, with predetermined settings via the use of engagement pin 210 and detents 212 positioned at predetermined degrees of rotation. For example, detents 212 of the shroud may be rotated by handle 114 across a fixed engagement tab 404 (shown in FIG. 4) of engagement pin 210.

FIG. 3A depicts the security camera assembly in a first illumination position, which is pivoted to (negative) −10 degrees of angular rotation relative to the lens optical axis 302. This view shows that with the −10 degrees of rotation, the LEDs are offset with a negative rotation relative to the lens optical axis 302. In this 0 degree position, the LEDs 108 are parallel with the lens optical axis 302.

FIG. 3B depicts the security camera assembly in a second illumination position. In this 0 degree position, the LEDs 108 are parallel with the lens optical axis 302.

FIG. 3C depicts the security camera assembly in a third illumination position. This view shows that with +10 degrees of rotation, the LEDs 108 are offset with a positive rotation relative to the lens optical axis 302.

Again, while the configuration shows increments of −10, 0, +10 degrees of rotation relative to the fixed lens optical axis 302, it should be appreciated that other increment degrees of rotation can be used. The increments can be controlled via detents or continuous rotation. Adjusting the illumination via pivoting grab handle 114 having LEDs 108 mounted thereon provides a user with adjustable control of reflections in the FOV. Such adjustments can advantageously be made in the field to optimize security lighting and minimization of reflections of each target area.

Figure 4:
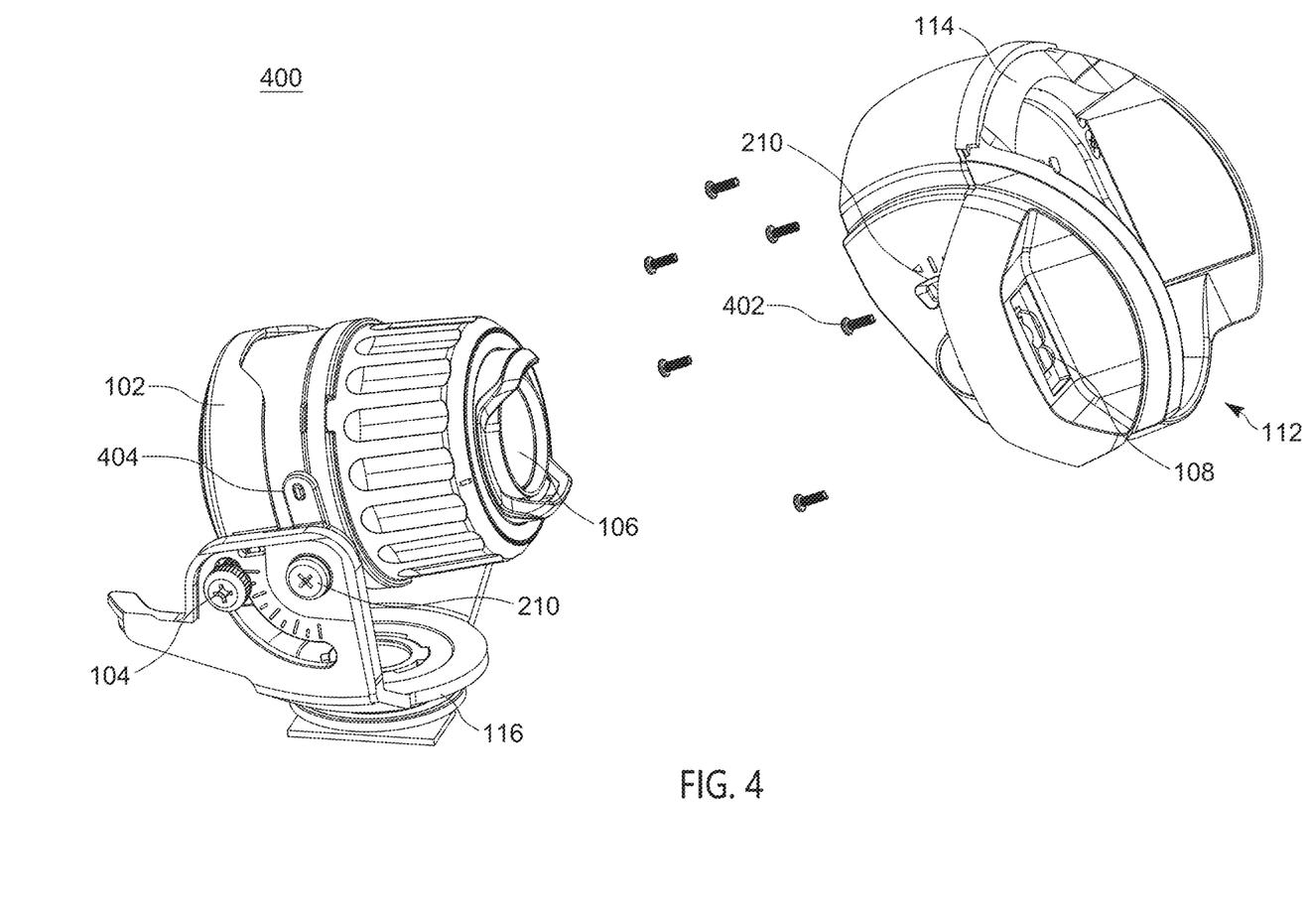
FIG. 4 depicts a partially exploded view of the camera assembly including the camera lens and shroud in accordance with some embodiments.

FIG. 4 depicts a partially exploded view 400 of the security camera assembly including the camera lens assembly 102 and shroud 112 in accordance with some embodiments. This view shows the lens tilt locking mechanism 104 coupled to the camera lens assembly 102. The lens tilt locking mechanism 104 may be formed of a thumb screw with or without lock washer. View 400 further shows an engagement tab 404 extending from engagement pin 212 as part of pivot mechanism 110 of other views. Shroud 112 may be mounted to the camera lens assembly 102 via a coupling means, such as screws 402, snaps, or other suitable attachment means.

Upon mounting of the shroud 112 to the camera lens assembly 102, the lens tilt locking mechanism 104 may be used to set the lens optical axis for a desired field of view (FOV) of a target image area. The FOV is set relative to the mounting base 116. Upon mounting of the shroud 112, the engagement tab 404 extending from engagement pin 210 cooperatively aligns with detents 212 to form the pivoting mechanism 110 of the previous figures. The grab handle 114 of shroud 112 enables user control of the pivoting mechanism 110 for adjusting the angular position of the LEDs 108. The shroud 112 including the integrated LEDs 108 pivots independently of the lens tilt locking mechanism 104 of the camera lens assembly 102, which advantageously enables the FOV to be set and the illumination adjusted without shifting the FOV.

Figure 5A:
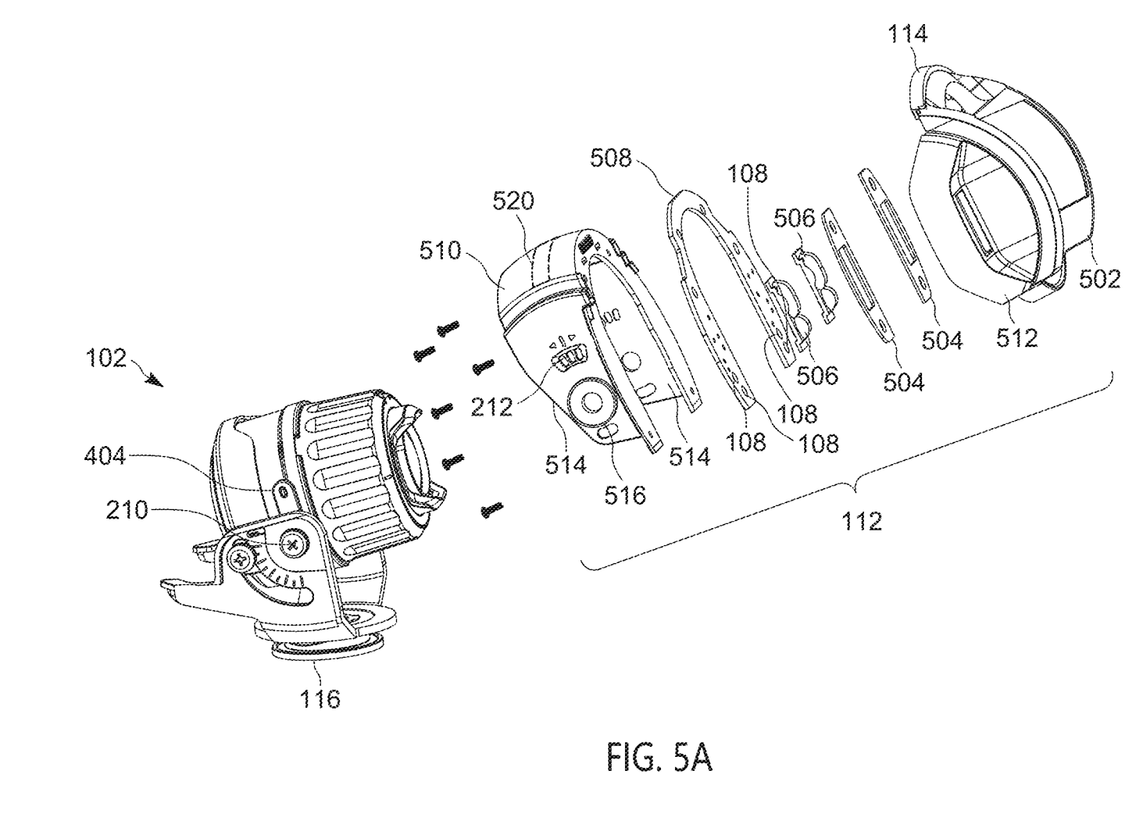
FIG. 5A shows a more detailed exploded view of the shroud in accordance with some embodiments.

FIG. 5A shows a more detailed exploded view of the shroud 112 aligned with camera lens assembly 102 in accordance with some embodiments. In this exploded view 500, the shroud 112 is separated into various sub-portions including front portion 502, gap pads 504, lenslets 506, substrate 508 with LEDs 108 mounted thereon, and shroud handle portion 510. The shroud handle portion 510 provides the control mechanism for grab handle 114.

The front portion 502 may be formed, for example, of a hard plastic configured to surround a perimeter of the camera lens assembly 102 and within which a heat sink 512 may be integrated for dissipating heat from the LEDs 108. The substrate 508 of shroud 112 may be formed of printed circuit board (PCB) or other suitable substrate material upon which to mount the LEDs 108 and lenslets 506. The lenslets 506 may be selected to provide additional control of the light beam angle. For some applications, the light beam angle of the lenslet 506 may be selected for spot lighting, and for other applications, the lenslet may be selected for flood lighting. The shroud handle portion 510 includes side walls 514 extending therefrom. One sidewall includes the detents 212 and through-hole 516 which respectively align and engage with engagement tab 404 and engagement pin 210 of camera lens assembly 102, thereby forming pivoting mechanism 110 of the previous figures. The portions of the shroud 112 may be assembled via a combination of snap fit and screws or other known attachment means.

In the completed assembly, a user may pivot the LEDs 108 to a selected position using grab handle at 114 of front portion 502 or by grabbing the sides walls 514 of portion 510 or by grabbing the shroud handle portion 510. The angle of rotation of the LEDs 108 causes corresponding rotation of the detents 212 of portion 510 which enables engagement of the detents to engagement tab 404 of camera lens assembly 102.

Figure 5B:
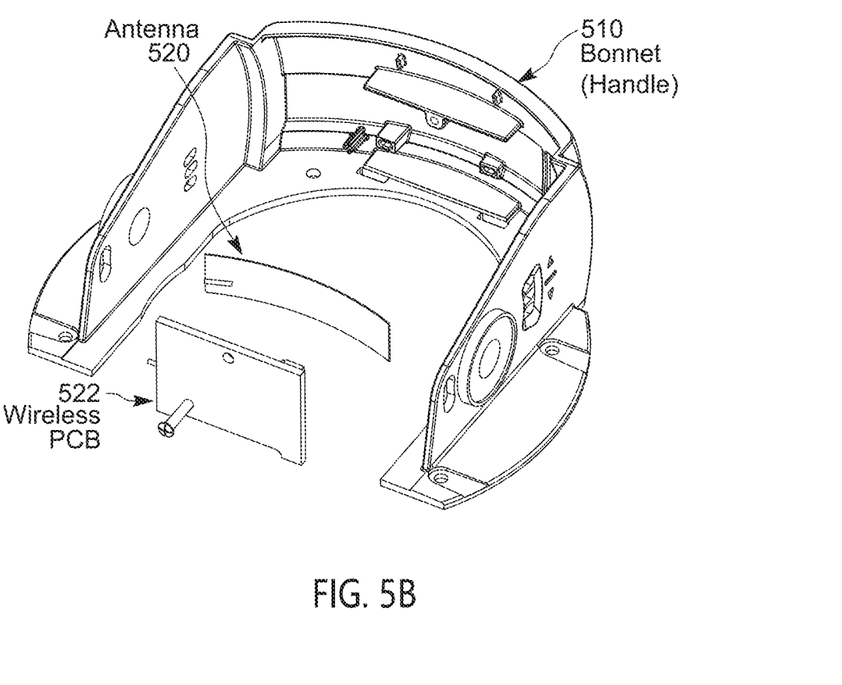
FIG. 5B shows a perspective view a shroud handle portion with antenna embedded therein portion in accordance with a further embodiment.

In an additional embodiment, FIG. 5A and FIG. 5B further show an antenna 520 embedded within an apex (bonnet) of the shroud handle portion 510. The antenna may be, for example, a flex substrate antenna coupled to a printed circuit board (PCB) 522 having an internet of things (IoT) chip integrated thereon. Power and signals to the antenna 520 and PCB 522 are supplied via a set of wires (not shown) that are connected to a processor board located at the base of the camera housing. Wireless communications may take place using a wireless protocol on a low frequency band to send data from the security camera to a smart hub of a system including external sensors. For optimum antenna performance, placement of the antenna 520 is preferably kept to at least a predetermined distance (for example 10 mm) away from any metal object within the security camera assembly. As the LEDs 108 pivot, the antenna 520 correspondingly pivots. The pivot range of motion of pivoting mechanism 110 (formed of engagement pin 210, engagement tab 404, and detents 212) is preferably configured for adjustability that maintains both LED illumination through the transparent dome 154 (of FIG. 1B) and also maintain the position of antenna 520 within the dome. In other words, (referring to FIG. 1A, FIG. 1B, FIG. 5A, FIG. 5B) for optimum illumination and optimum antenna performance, the pivoting of the shroud 112 is configured to keep the LEDs 108 and the antenna 520 within the transparent dome 154 and outside of the lower housing portion 156 (of FIG. 1B). Maintaining such a configuration prevents blocking the illumination of the LEDs 108 and prevents detuning of the antenna 520 by metal portions of the housing.

Figure 6A:
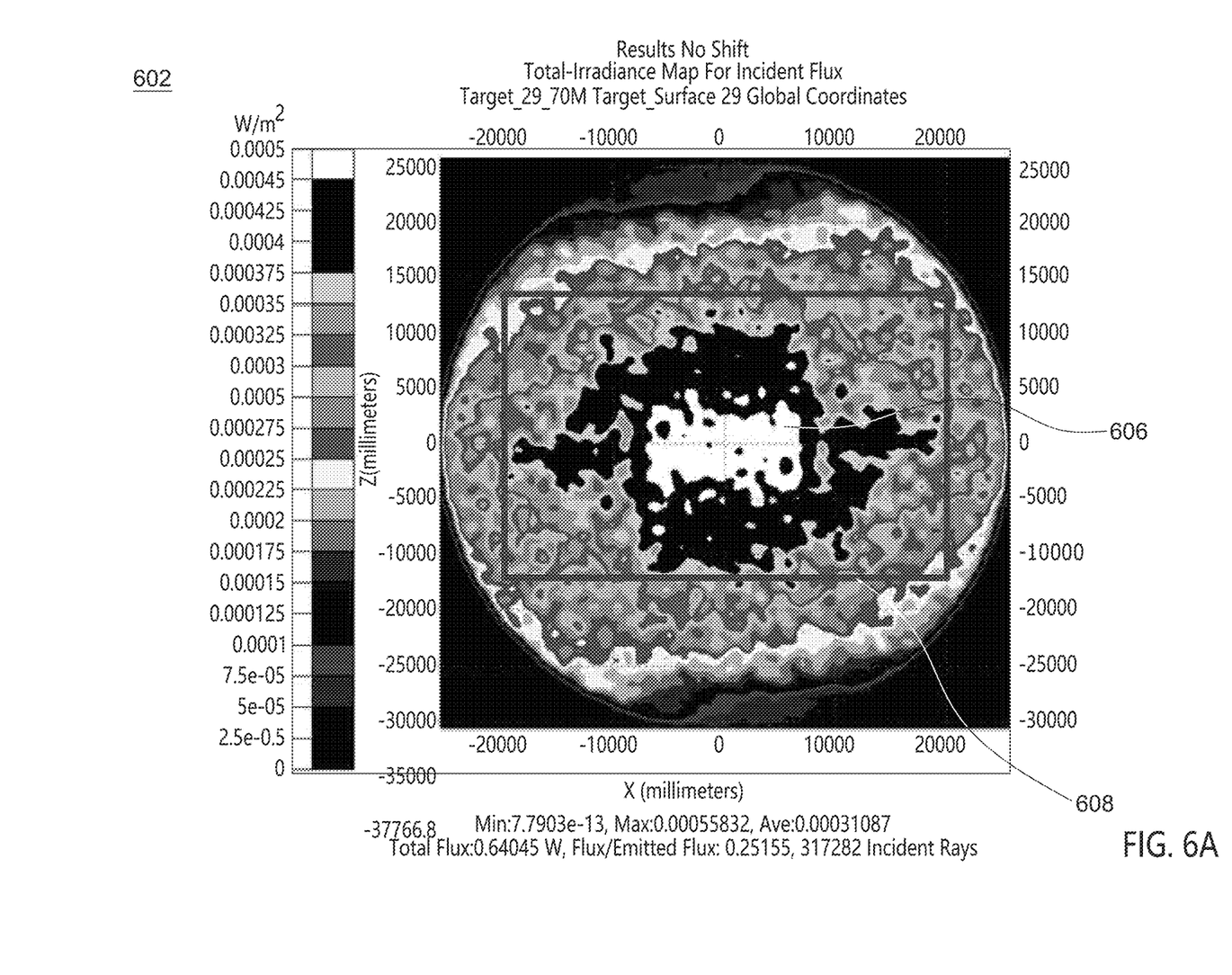
FIGS. 6A, 6B show images comparing movement of the hotspot, in accordance with some examples.
Figure 6B:
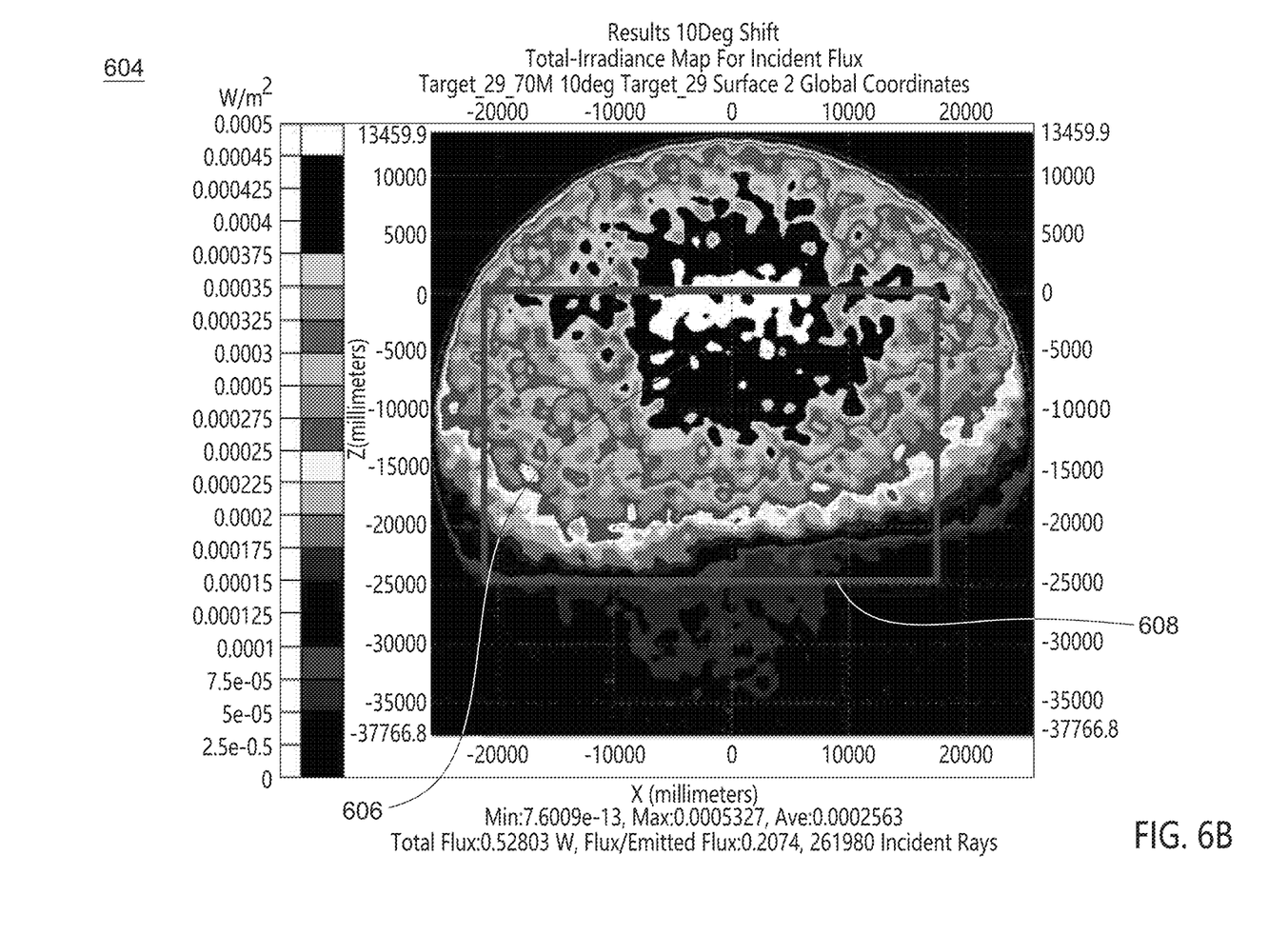

FIGS. 6A, 6B show simulated images comparing movement of a hotspot, in accordance with some examples. The simulations were performed using ray tracing software, a technique used to represent propagation of optical wavefronts through an optical system resulting in a total Irradiance Map for incident flux. The distance from the target was set to 70 meters (a variable figure based on installation). The horizontal axis represents the horizontal distance from lens optical center in x-millimeters (0 mm-135846 mm), and the vertical axis shows vertical distance from the optical center in millimetres (0 mm-135857 mm) along with light power per square meter (W/m$^2$). Image 602 shows optical simulation results—with LEDs not tilted. Image 604 shows an optical simulation result—with LEDs tilted by 10 degrees from the lens optical axis. In image 602, hotspot 606 is identified in the center of image frame 608. In image 604, with LEDs pivoted 10 degrees; the hotspot 606 has been moved away from the center of the image of image frame 608. If pivoted by, for example, 15 degrees the hotspot 606 can be completely moved out of the image frame 608.

Accordingly, there has been provided a security camera that incorporates LEDs into a pivoting grab handle that beneficially allows in field illumination adjustment. The angular adjustment of LEDs independent of the lens optical axis aids in the reduction of external reflections which minimizes reduction of hot spots. The internally mounted grab handle with LEDs allow the security camera to retain a compact size without adding external parts. Removal of the removable cover provides interior access to the lens tilt locking mechanism and pivoting mechanism for on-site adjustments. Further embodiments, have provided for placement of an antenna within the pivoting grab handle which advantageously keeps the antenna away from interior metal elements which might cause detuning.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

Similarly, in this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A security camera assembly, comprising:
   a camera lens assembly;
   a lens tilt locking mechanism coupled to the camera lens assembly for setting a field of view (FOV) for a camera lens of the camera lens assembly; and
   a grab handle having LEDs mounted thereon, the grab handle being pivotally coupled to the camera lens assembly via a pivoting mechanism, the grab handle having LEDs mounted thereon providing independent pivoting control of illumination to the FOV without shifting the FOV.

2. The security camera assembly of claim 1, further comprising:
   a housing having a removable cover with transparent dome, the camera lens assembly being mounted internally within the housing, wherein the removable cover provides user access to the lens tilt locking mechanism and grab handle for in-field adjustment of reflections within the FOV.

3. The security camera assembly of claim 1, further comprising:
   a mounting base coupled to the camera lens assembly, the lens tilt locking mechanism setting a lens optical axis for the FOV for the camera lens, the FOV being set relative to the mounting base; and
   the grab handle pivoting the LEDs mounted thereon along an LED illumination axis adjusted relative to the lens optical axis of the camera lens.

4. The security camera assembly of claim 1, wherein the grab handle comprises first and second side walls extending therefrom, the first and second side walls respectively comprising first and second substrates upon which the LEDs are mounted.

5. The security camera assembly of claim 1, further comprising a lenslet covering each LED.

6. The security camera assembly of claim 1, wherein pivoting the grab handle having LEDs mounted thereon provides adjustable control of reflections in the FOV.

7. The security camera assembly of claim 1, wherein the pivoting mechanism comprises detents positioned at predetermined degrees of rotation.

8. The security camera assembly of claim 1, wherein the pivoting mechanism provides continuous rotation.

9. The security camera assembly of claim 1, further comprising:
   an antenna embedded within the grab handle.

10. The security camera assembly of claim 1, further comprising:
    an antenna embedded within the grab handle, the antenna pivoting in response to the grab handle being pivoted.

11. A security camera, comprising:
    a housing having a removable cover with transparent dome;
    a mounting base coupled within the housing;
    a camera lens assembly with a camera lens extending therefrom, the camera lens assembly coupled to the mounting base;
    a lens tilt locking mechanism coupled to the camera lens assembly for setting a lens optical axis for a field of view (FOV) for the camera lens, the FOV being set relative to the mounting base;
    a shroud coupled to the lens assembly, the shroud comprising:
       a plurality of LEDs mounted to a printed circuit board (PCB);
       a pivoting mechanism for pivoting the PCB to adjust a position of the plurality of LEDs; and
       the plurality of LEDs pivoting by a predetermined degree relative to the lens optical axis.

12. The security camera of claim 11, wherein the security camera is a surface mountable security camera, and wherein the mounting base couples the surface mountable security camera to a ceiling or wall.

13. The security camera of claim 11, wherein the shroud further comprises a grab handle, and the grab handle controls the pivoting mechanism for adjusting a position of the plurality of LEDs.

14. The security camera of claim 13, wherein pivoting the grab handle having the plurality of LEDs mounted thereon provides adjustable control of reflections in the FOV.

15. The security camera of claim 13, further comprising:
    an antenna embedded within the grab handle.

16. The security camera of claim 13, further comprising:
    an antenna embedded within the grab handle, the antenna pivoting in response to the grab handle being pivoted.

17. The security camera of claim 11, further comprising a lenslet covering each LED.

18. The security camera of claim 11, wherein the pivoting mechanism comprises:
    detents on the shroud and a corresponding engagement tab on the camera lens assembly.

19. The security camera of claim 11, wherein removal of the removable cover provides interior access to the lens tilt locking mechanism and pivoting mechanism for on-site adjustments.

* * * * *